United States

Yano et al.

[11] 3,944,334
[45] Mar. 16, 1976

[54] ACOUSTO-OPTIC FILTER

[75] Inventors: Tsutomu Yano; Akinori Watanabe, both of Kawasaki, Japan

[73] Assignee: Matsushita Electric Industrial Company, Ltd., Osaka, Japan

[22] Filed: Aug. 27, 1974

[21] Appl. No.: 500,887

[30] Foreign Application Priority Data
Aug. 30, 1973 Japan.................. 48-97979

[52] U.S. Cl.................................. 350/161; 350/149
[51] Int. Cl.²............................................ G02F 1/34
[58] Field of Search............................ 350/161, 149

[56] References Cited
OTHER PUBLICATIONS

"Acousto-Optic Light Deflectors Using Optical Activity in Paratellurite," by Warner et al., J. Appl. Phys., V. 43 No. 11, Nov. 1972.

"New Noncollinear Acousto-Optic Tunable Filter Using Birefringence in Paratellurite," by Yano, et al., Appl. Phys. Ltrs. Vol. 24 No. 6, Mar. 1974.

Primary Examiner—Vincent P. McGraw
Attorney, Agent, or Firm—Stevens, Davis, Miller & Mosher

[57] ABSTRACT

An acousto-optic filter utilizing the far-off-axis anisotropic Bragg diffraction comprising an optically anisotropic acousto-optic medium embodied by paratellurite. The light entrance surface is slanted to the crystalline axis to make a light beam incident perpendicularly to the surface. The light exit surface is slanted to the direction of the entrance surface to minimize the dispersion of diffracted angle due to light wave length.

6 Claims, 7 Drawing Figures

ACOUSTO-OPTIC FILTER

This invention relates to an acousto-optic filter for selecting light of an arbitrary wavelength from an incident light beam by changing the frequency of an ultrasonic wave appropriately, and more particularly to an acousto-optic filter in which incidence of light is normal to an incident surface.

An object of this invention is to provide an acousto-optic filter capable of reducing the variation in the angle of diffraction due to the wavelength change.

The above and other objects, features and advantages of this invention will become apparent from the following description when taken in conjunction with the accompanying drawings in which.

Conventional acousto-optic filter may be classified into two broad classes. Namely, one is called the collinear type and the other the noncollinear type. In a collinear type acousto-optic filter, a light beam and an ultrasonic wave are propagated along the same linear line in an optically anisotropic medium to cause interaction therebetween. The non-collinear type includes the isotropic Bragg diffraction type and the far-off-axis anisotropic Bragg diffraction type. The latter has a far higher practical value. In an acousto-optic filter of the far-off-axis anisotropic Bragg diffraction type, a light beam and an ultrasonic wave are propagated at an angle different from the right angle therebetween to cause interaction. An example of a far-off-axis anisotropic Bragg diffraction type filter will be described with reference to FIG. 2 hereunder.

When an ultrasonic wave and a light beam are interacted in a crystal having two phase velocities of light in the propagating direction, diffracted light appears generally above a certain frequency of the ultrasonic wave when the Bragg's condition is satisfied. Here, the phase of the diffracted light varies by 180° from that of the incident light and the polarization changes. This is the so-called anisotropic Bragg diffraction. When the angle of incidence is further increased, another diffracted light appears at a certain angle.

Figure 1:
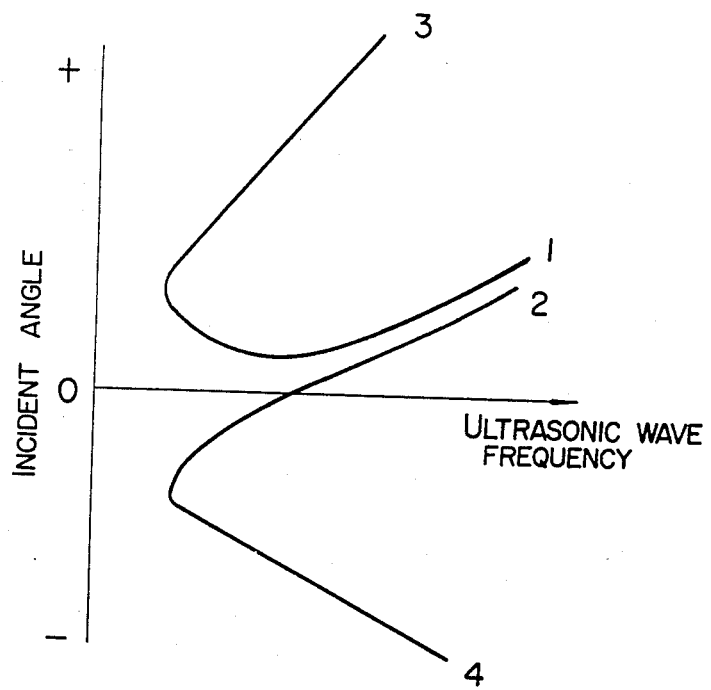
FIG. 1 is a diagram for illustrating the anisotropic Bragg diffraction.

The diffraction phenomenon at larger incident angles is called the far-off-axis anisotropic Bragg diffraction, and those at smaller incident angles are called the near-by-axis anisotropic Bragg diffraction. The relation between the angles of incidence and diffraction is as shown in FIG. 1. The far-off-axis anisotropic Bragg diffraction is generated above a certain frequency and the incident angle increases abruptly as indicated by curves 3 and 4. The near-by-axis anisotropic Bragg diffraction indicated by curves 1 and 2 is the phenomenon often utilized in conventional light deflectors and modulators.

Figure 2:
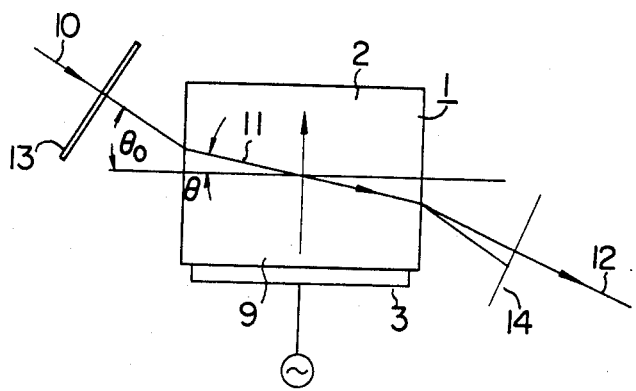
FIG. 2 is a schematic cross-section of an acousto-optic filter utilizing the far-off-axis anisotropic Bragg diffraction.

In FIG. 2, a filter medium 1 comprises an acousto-optical medium 2 and a piezoelectric transducer 3. An electric signal is converted in the piezoelectric oscillator 3 to become an ultrasonic wave 9 propagating in a crystal. An incident light 10 is linearly polarized in a polarizer 13, is directed to the medium at an incident angle of $\theta_o$, propagates in the crystal in a direction forming an angle $\theta$ with respect to the optic axis, mutually interacts with the ultrasonic wave 9 propagating normal to the optic axis to generate a diffracted light 11. The diffracted light 11 emerges from the crystal as a linearly polarized beam having a plane of polarization rotated 90° from that of the incident light.

Figure 3:
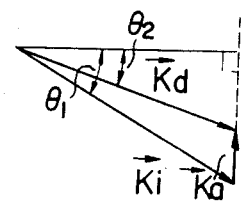
FIG. 3 is a diagram of wave vectors for illustrating the operational conditions of the filter of FIG. 2.

For generating the far-off-axis anisotropic diffraction, it is necessary to satisfy the relation of the wave vectors shown in FIG. 3. This can be expressed in the following formulae (1), (2) and (3).

$$\left. \begin{array}{l} |\vec{K_i}| = \dfrac{2\pi n_1}{\lambda_o} \\[4pt] |\vec{K_d}| = \dfrac{2\pi n_2}{\lambda_o} \\[4pt] |\vec{K_a}| = \dfrac{2\pi f_a}{v} \end{array} \right\} \quad (1)$$

Here, $n_1$ and $n_2$ are refractive indices for the extraordinary and ordinary rays when the normal of the light wave front is slanted by $\theta_1$ and $\theta_2$ from the optic axis, and can be expressed by the following equations.

$$\left. \begin{array}{l} n_1^2 = n_e^2 \left(1 + 2\delta\cos^2\theta_1 + \dfrac{(n_e^2 - n_o^2)}{n_o^2}\sin^2\theta_1\right) \\[4pt] n_2^2 = n_o^2 (1 - 2\delta\cos^2\theta_2) \end{array} \right\} \quad (2)$$

In equations (1) and (2), $\lambda_o$ is the wavelength of light in vacuum, $f_a$ the frequency of an ultrasonic wave, $v$ the acoustic velocity of the medium, $n_o$ and $n_e$ refractive indices for the ordinary and extraordinary rays in the medium, and $2\delta$ the gyration constant defined when the medium is optically active. Symbol $\vec{K}$ represents a wave vector.

The angles of incidence and diffraction for a far-off-axis anisotropic Bragg diffraction can be obtained as the larger solutions of $\theta$'s satisfying the following equations (3) from equations (1) and (2) or from FIG. 3.

$$\left. \begin{array}{l} \dfrac{2\pi n_1}{\lambda_o}\cos\theta_1 = \dfrac{2\pi n_2}{\lambda_o}\cos\theta_2 \\[4pt] \dfrac{2\pi n_1}{\lambda_o}\sin\theta_1 - \dfrac{2\pi n_2}{\lambda_o}\sin\theta_2 = \dfrac{2\pi f_a}{v} \end{array} \right\} \quad (3)$$

An approximated solution of $\theta_1$ can be expressed as $$\sin\theta_1 = \dfrac{\lambda_o}{v(n_e - n_o)} f_a \quad (4)$$

In an acousto-optic filter, the angle of incidence $\theta_1$ is fixed and the frequency of the ultrasonic acoustic wave $f_a$ is changed to tune $\lambda_o$.

Figure 4:
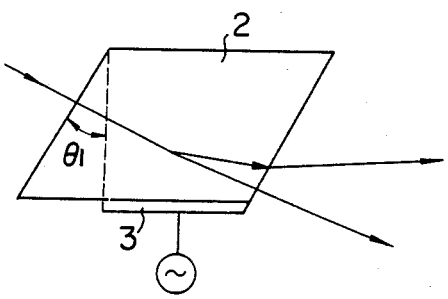
FIGS. 4 and 5 are schematic cross-sections of acousto-optic filters.

Generally in acousto-optic filters according to this method, the entrance and exit surfaces are slanted by $\theta_1$ to make normal entrance and exit of light as shown in FIG. 4. Here, the angle of diffraction $\theta_2$ can be expressed from equations (3) as $$\cos\theta_2 = \frac{n_1}{n_2}\cos\theta_1 \qquad (3)'$$

Figure 5:
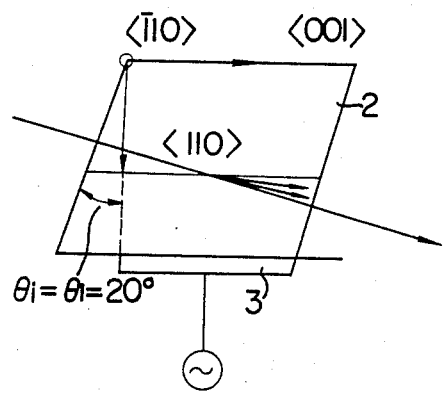

When the wavelength is varied, $n_1$ and $n_2$ vary so that the angle of diffraction $\theta_2$ varies depending on the wavelength as seen from FIG. 3. For example, when paratellurite is used as the medium, a transverse displacement wave is generated having an oscillation in the $<\bar{1}10>$ direction and propagation along the $<110>$ direction, and a light beam is directed with an angle $\theta_i$ of 20° slanted from the $<001>$ axis and with a polarization corresponding to the extraordinary ray as is shown in FIG. 5, the angle $\theta_2$ is equal to 18°49' at a light wavelength of $\lambda = 6328$A and outside the crystal the exit direction is shifted about 2°31' from the incident direction. For light of $\lambda = 4880$A, $\theta_2 = 18°44'$ and the shift is about 2°57' outside the crystal.

Since the diffraction angle changes depending on the wavelength of light in this way, when an acousto-optic filter is used for color separation or as a spectrometer, there is a drawback that a light detector should be moved depending on the wavelength.

According to a basic embodiment of this invention, the exit surface is not formed parallel to but slanted by a small angle from the direction incident surface, thereby eliminating the above drawback.

Figure 6A:
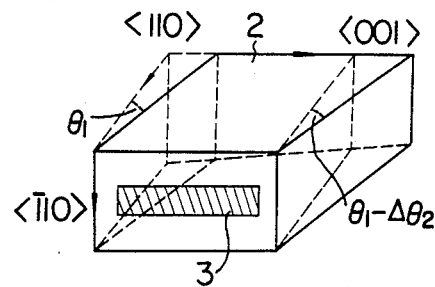
FIGS. 6a and 6b are a schematic perspective view and a schematic cross-section of a dispersionless embodiment of the acousto-optic filter according to this invention respectively.
Figure 6B:
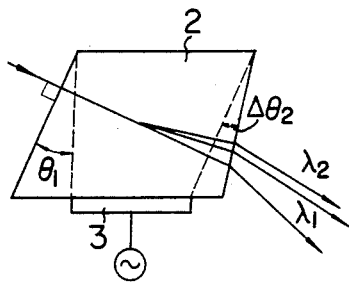

The embodiment utilizing paratellurite as the acousto-optic medium is shown in FIGS. 6a and 6b. In the figures, an acousto-optic filter comprises an acousto-optic medium 2 and a transducer 3. The normal direction of the exit surface is slightly slanted to the optic axis ($<001>$ axis) by $\Delta\theta_2$ as compared with the incident surface. The relation between angles of incidence and diffraction can be expressed by the following equations by Snell's law and equation (3).

$$\left. \begin{array}{c} n_1 \cos\theta_1 = n_2 \cos\theta_2 \\ n_2 \sin(\theta_2 - \Delta\theta_2) = \sin\theta_3 \end{array} \right\} \qquad (5)$$

These equations (5) are solved over the whole wavelength region required and the most preferable value of $\sin\theta_3$ is determined to decide $\Delta\theta_2$.

Assuming the angle of incidence to be set at $\theta_1 = 20°$, when the offset angle $\Delta\theta_2$ is set at $\Delta\theta_2 = 3°19'$, for light of $\lambda = 6328$A, the angle of incidence to the exit surface in the crystal is 2°8' and the exit angle outside the crystal is 4°48', and for light of $\lambda = 4880$A the values are 2°3' and 4°47'.

In this case, the shift between the exit angles for light of 6328A and 4880A which was 18 minutes in the conventional arrangement is reduced to about 1 minute according to this invention. Here, the shift in the exit angle is within the same order for other wavelengths.

As is described above, the variation in the exit angle can be reduced and lights of various wavelengths can be obtained in substantially the same direction according to this invention.

What is claimed is:

1. An acousto-optic filter comprising:
   a medium in which light has two different phase velocities in a propagating direction, said medium having entrance and exit surfaces for light rays,
   transducer means for propagating an ultrasonic wave in said medium, and
   means for directing a light beam to the entrance surface of said medium so as to cause far-off-axis anisotropic Bragg diffraction with said ultrasonic wave, said diffraction occurring at a relatively large incident angle with respect to the plane of the wave front of said ultrasonic wave in said medium, the propagation direction of the diffracted light being displaced from the plane of the wave front of said ultrasonic wave in the same direction as that of undiffracted light to produce optical filtering,
   the entrance surface of said medium being slanted by a predetermined angle from the plane normal to the wave front of the ultrasonic wave.

2. An acousto-optic filter according to claim 1, wherein said medium is a paratellurite single crystal.

3. An acousto-optic filter according to claim 1, wherein the normal direction of the exit surface of said medium is slanted from the normal of the acoustic wave front by a different angle from that of the entrance surface so as to minimize the variation in the exit angle of a transmitted light beam due to variations in the wavelength.

4. An acousto-optic filter according to claim 3, wherein said medium is a paratellurite single crystal.

5. An acousto-optic filter according to claim 4, wherein said acoustic wave is propagated along the $<110>$ direction of the paratellurite single crystal.

6. An acousto-optic filter according to claim 5, wherein the normals of the entrance surface and the acoustic wave front make an angle of 20° and the normals of the exit surface and the acoustic wave front make an angle of 16°41'.

* * * * *